United States Patent [19]

Keane et al.

[11] Patent Number: 5,108,548
[45] Date of Patent: Apr. 28, 1992

[54] LOW PRESSURE DISTILLATION APPARATUS

[75] Inventors: Brian H. Keane, Clareville Beach; Farhad Shafaghi, Turramurra; Colin W. Spencer, Bilgola, all of Australia

[73] Assignee: Valuepace Limited, Kent, England

[21] Appl. No.: 477,885

[22] PCT Filed: Oct. 26, 1988

[86] PCT No.: PCT/AU88/00418
§ 371 Date: Apr. 16, 1990
§ 102(e) Date: Apr. 16, 1990

[87] PCT Pub. No.: WO89/03715
PCT Pub. Date: May 5, 1989

[30] Foreign Application Priority Data

Oct. 26, 1987 [AU] Australia .................. PI5083

[51] Int. Cl.⁵ .................................................. B01D 3/10
[52] U.S. Cl. ...................................... 202/182; 159/24.2; 159/DIG. 16; 159/DIG. 40; 202/185.6; 202/262; 202/205; 203/11; 203/26; 203/91; 203/DIG. 4; 203/DIG. 8
[58] Field of Search .................. 203/11, 26, 27, 100, 203/91, DIG 4, DIG. 8, DIG. 17; 159/24.2, DIG. 40, DIG. 16; 202/205, 182, 185.6, 202, 233, 199; 62/324.1, DIG. 2, DIG. 21

[56] References Cited

U.S. PATENT DOCUMENTS

| | | | |
|---|---|---|---|
| 1,966,938 | 7/1934 | Stone | 203/26 |
| 2,793,988 | 5/1957 | Latham, Jr. et al. | 203/26 |
| 3,192,130 | 6/1965 | Pottharst, Jr. | 203/26 |
| 3,385,768 | 5/1968 | Yost | 203/26 |
| 3,389,059 | 6/1968 | Goeldner | 203/26 |
| 3,433,717 | 3/1969 | Loebel | 203/26 |
| 3,567,591 | 3/1971 | Othmer | 203/26 |
| 3,637,465 | 1/1972 | Wilson | 203/26 |
| 3,699,006 | 10/1972 | Hasslacher | 203/26 |
| 3,855,072 | 12/1974 | Liu | 202/173 |
| 3,956,072 | 5/1976 | Huse | 203/26 |
| 4,731,164 | 3/1988 | Williamson | 203/11 |

FOREIGN PATENT DOCUMENTS 2044918 3/1971 Fed. Rep. of Germany ........ 203/26

*Primary Examiner*—Virginia Manoharan
*Attorney, Agent, or Firm*—Beveridge, DeGrandi & Weilacher

[57] ABSTRACT

A low pressure distillation apparatus in which evaporation takes place at sub-atmospheric pressures. An evaporation chamber has a feed liquid inlet port, a concentrated liquid outlet port, and a vapor outlet port. The vapor outlet port is in communication with a vapor treating device immersed in distillate in a distillate chamber. The preferred vapor treating device is a rotating impeller pump which reduces the pressure in the evaporation chamber to a working pressure, draws off vapor boiled from the liquid in the evaporation chamber, entrains the vapor in a stream of distillate, and condenses the vapor in the stream of distillate to transfer the latent heat of condensation of the vapor directly to the distillate.

7 Claims, 2 Drawing Sheets

LOW PRESSURE DISTILLATION APPARATUS

TECHNICAL FIELD

This invention relates to low pressure distillation apparatus, that is distillation apparatus in which evaporation takes place at sub-atmospheric pressures. Although the invention will be described with particular reference to the desalination of water it is not limited to that use.

BACKGROUND ART

Much attention has been given to methods of improving the efficiency of distillation systems, especially those used in water desalination, with a view to reducing the costs of production of purified water.

It is usual practice in distillation to condense the distillate in a condenser section of the evaporation chamber. Vapor enters the condenser section, is cooled and condensed by a cooling water coil, and gives up heat including latent heat of condensation. Cooling water enters this coil from a separate circuit, takes up the "recovered heat", and emerges at a higher temperature. The "recovered heat" is often utilized to heat feed liquid entering the evaporation chamber by using the feed as coolant in the cooling water coil.

In order to improve efficiency, it is common to use a mechanical vapor compression system in which vapor is withdrawn from the evaporation chamber and condensed by means of a centrifugal compressor. The compressor is typically the most expensive component of the plant, requiring vapor seals, bearings, oil seals and rotating parts. It is also the most easily damaged component.

There are many advantages in operating stills at sub-atmospheric pressures. Such systems operate at low temperatures for example in the range 30° to 50° C. At these temperatures, problems associated with the formation of scale are greatly reduced and plastics construction materials may be used. However, the difficulties in using vapor compression in sub-atmospheric systems are greater in comparison with stills operating at or above atmospheric pressure, since the compressor must extract vapor at a lower pressure.

An object of the present invention is to provide an efficient apparatus for distillation which is operable at sub-atmospheric pressures and which alleviates at least some of the disadvantages of the prior art.

DISCLOSURE OF THE INVENTION

According to the invention there is provided a low pressure distillation apparatus comprising:
a sealed evaporation chamber having a feed liquid inlet port, a concentrated liquid outlet port, and a vapor outlet port; the vapor outlet port being in communication with a vapor entrainment device situated within a distillate tank, wherein, in use of the apparatus vapor condenses in the entrainment device releasing latent heat of condensation to the distillate.

For preference the vapor entrainment device may comprise a rotating impeller pump which is wholly immersed in liquid distillate and which generates a stream of liquid distillate into which the vapor is entrained and condensed such that the latent heat of condensation of the vapor is recovered directly by the distillate. This heat may subsequently be used to assist in vaporization of the liquid in the evaporation chamber by use of a heat-pump system.

Advantageously there is a shear tube in the inlet of the impeller to prevent pre-swirl of the distillate and entrained gas and vapor.

Preferably there is a heating coil in the evaporation chamber and a first heat exchange coil in the distillate tank, the heating coil being arranged in series and upstream of the first heat exchange coil in a heat-pump circuit The concentrated liquid is drawn off and sometimes referred to as "residue", "bottoms" or "blow-down". The concentrated liquid outlet port may be in communication with a blow-down entrainment device situated within a blow-down tank. The blow-down entrainment device may incorporate a second rotating impeller pump which is wholly immersed in its delivery medium.

In one embodiment a second heat exchange coil is situated in the blow-down tank and is connected in series in the heat-pump circuit.

BRIEF DESCRIPTION OF THE DRAWINGS

A preferred embodiment of the invention will now be described by way of example only with reference to the accompanying drawings, in which.

BEST MODE FOR CARRYING OUT INVENTION

Figure 1:
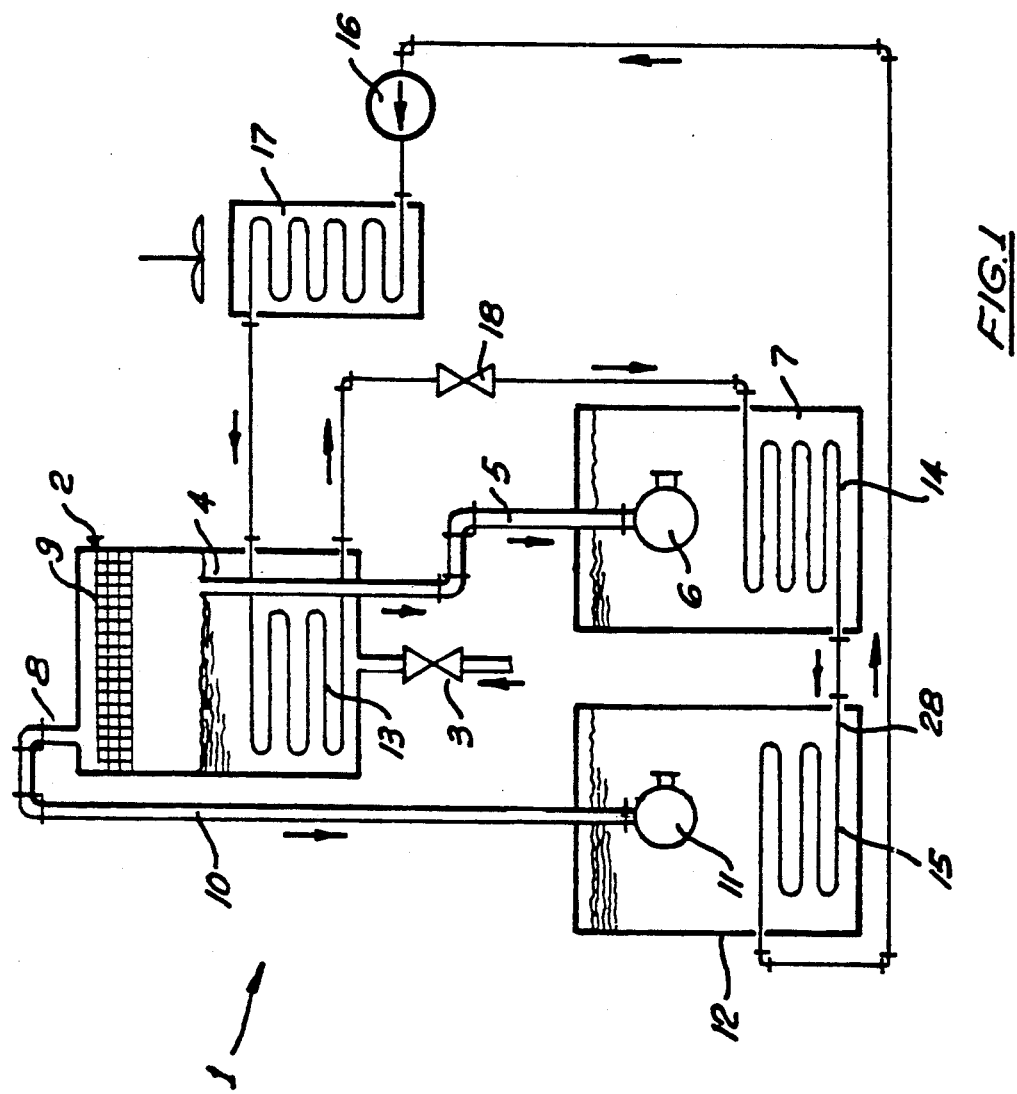
FIG. 1 is a schematic illustration of a low pressure distillation apparatus embodying the present invention.

Referring now to FIG. 1 low pressure distillation apparatus 1 comprises a sealed evaporation chamber 2 into which saline feed solution is selectively admitted via a submerged feed line 3, while brine concentrated in the evaporation chamber and particulate matter is removed via a concentrated solution outlet port 4 and a blow-down line 5 arranged to set the operating liquid level in the evaporation chamber.

The blow-down line 5 terminates in a blow-down entrainment device 6 which is wholly immersed within its delivery medium in a blow-down tank 7.

A vapor outlet port 8 in the top portion of chamber 2 is separated from the surface of the solution by a mist/droplet separator 9 comprising a wire mesh. Vapor outlet port 8 is connected, via vapor outlet line 10, to a vapor entrainment device 11 immersed wholly within the distillate in distillate tank 12.

A refrigerant type heat-pump circuit is used for heat recovery, and comprises heating coil 13 situated below the surface of the solution in evaporation chamber 2. Refrigerant circulates through coil 13, through a heat exchange coil 14 in the blow-down tank 7, and through a heat exchange coil 15 in distillate tank 12, all arranged in series. The heat pump-circuit is completed by a compressor 16, a fan assisted radiator 17 and a liquid to gas expansion device 18.

Figure 2:
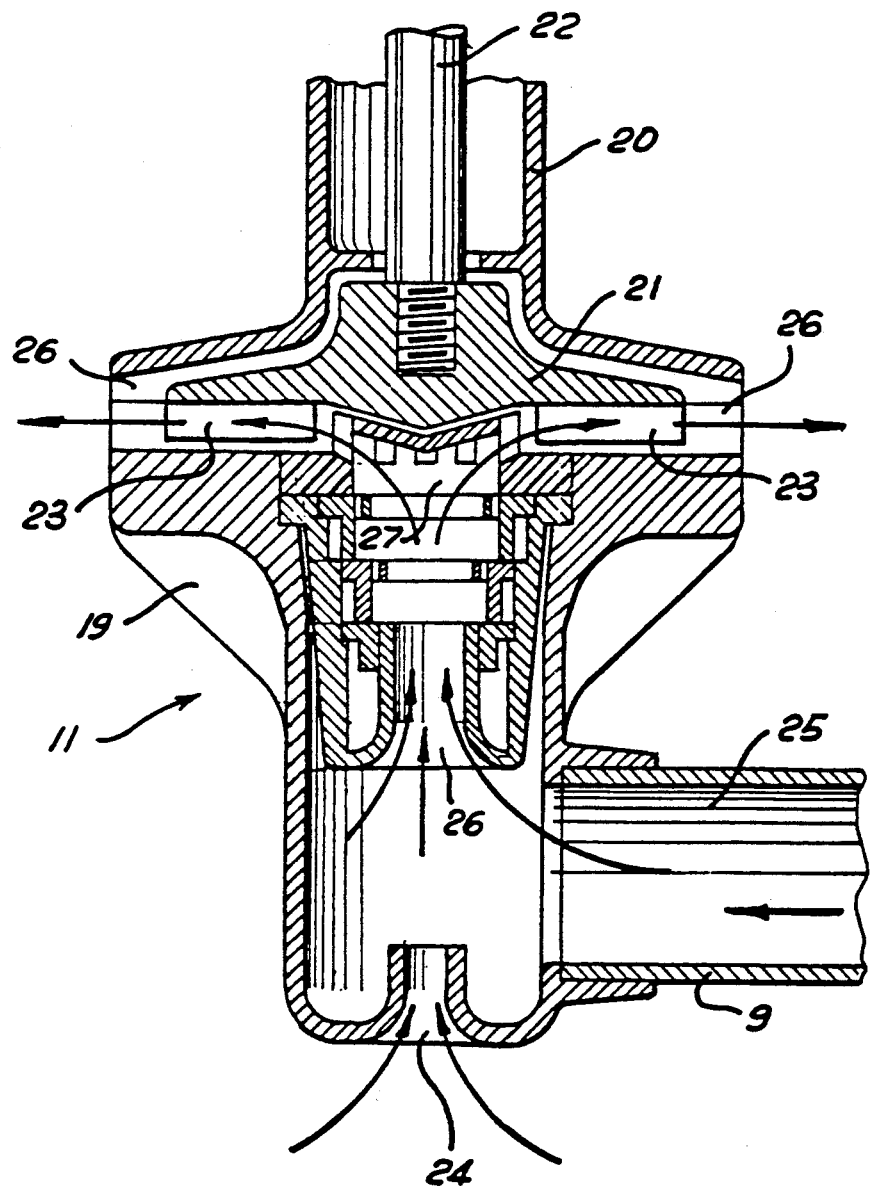
FIG. 2 shows a cross-sectional elevation of an entrainment device used in preferred embodiments of the invention.

Vapor entrainment device 11 includes a rotating impeller pump and will now be described in greater detail with reference to FIG. 2. The entrainment device comprises a lower casing 19 and upper casing 20 in which a rotating impeller 21 is mounted on the end of a drive shaft 22. Passages 23 through the impeller 21 communicate between liquid inlet port 24, vapor inlet port 25, and outlets 26.

In use impeller 21 is spun at the end of drive shaft 22 by means of a motor (not illustrated) situated outside tank 12 and liquid from the distillate tank 12 is drawn in a stream through inlet nozzle 24 and up through throat 26 to pass through shear tube 27, which prevents pre-swirl being imparted to the liquid before it meets impeller 21. Centrifugal pumping action draws distillate through passages 23 and out of ports 26 to be returned to tank 12 As a result of throat 26 being wider than inlet 24 and the high velocity of the liquid stream leaving nozzle 24 a high suction effect is created on vapor inlet 25, and gas arriving at port 25 is entrained in the stream of liquid which extends between nozzle 24 and shear tube 27. The entrainment device is able to reduce the absolute pressure in evaporation chamber 2 to about 40 mm of mercury, lowering the boiling point of the solution in chamber 2 to about 35° C. These figures are of course merely illustrative and the pressure and corresponding boiling temperature may vary significantly from those quoted depending on the system design and the liquid being distilled.

Once the solution in chamber 2 begins to boil it drives off distillate vapor which has droplets removed as it passes through separator 9, and is then drawn through outlet line 10. When the vapor arrives at port 25 of the entrainment device it is partly Condensed on the stream of liquid, and partly taken through throat 26 in the gaseous state. The stream slows down as it passes through the gradually widening portion which extends between throat 26 and shear tube 27. This in turn caused an increase in pressure and the remaining vapor to condense.

Because there is direct thermal communication between the condensing vapor and the distillate the latent heat of condensation of the vapor is delivered to the distillate substantially without loss.

The latent heat delivered to the distillate is subsequently used to help vaporize the solution in evaporation chamber 2 by means of a refrigerant type heat-pump circuit involving heat exchange coil 15 and heating coil 13 At point 28 in the heat-pump circuit the refrigerant is in a gaseous state and is at a relatively cold temperature After passing through heat exchange coil 15, and withdrawing the latent heat of condensation received by the distillate, the refrigerant is still in the gaseous state but is now at a relatively higher temperature It then travels to the compressor 16 which compresses it and thereby increases its temperature by a significant further amount This hot compressed gas is then passed to de-super heater 17, in order to remove the excess heat from the system. The hot gaseous refrigerant then passes to heating coils 13 which are immersed in and heat the solution in the evaporation chamber 2 causing the solution to boil and the vapor to be driven off.

In giving up heat to the solution in the evaporation chamber the refrigerant cools and condenses so that by the time it leaves the evaporation chamber it has condensed to a liquid This liquid then passes to a throttling device 18, which may for instance comprise a capillary tube or expansion valve Throttling device 18 converts the high pressure liquid refrigerant to a relatively low pressure cold gas. This gas cools and therefore recovers heat from the concentrated brine in tank 7 via heat exchange coil 14 before passing to heat exchange coil 15 in distillate tank 12 to re-start the circuit.

Normally the concentrated brine is withdrawn from evaporation chamber 2 by an entrainment device 6 submerged in the blow-down tank Entrainment device 6 may include a rotating impeller, and also draws vacuum on chamber 2 contributing to the low pressure in it.

Thermal balance in the system is assisted by recycling latent heat from the product vapor condensing, and heat from the blow-down liquid, back to the heating coil in the evaporation chamber In a typical heat pump system energy gained from the compressor, for instance in the form of "heat of compression" or friction, usually exceeds energy losses, for instance from pipework and the distillation Chamber to the air, and has to be removed from the system; in the present case by de-super heater 17. In other embodiments, any excess heat may be stored and later used for further evaporation or to heat feed liquid.

The embodiments of the invention enjoy the advantages usually associated with low pressure/low temperature systems. Furthermore because the vapor is condensed in an entrainment device which is submerged in the distillate, very efficient recycling of latent heat is possible, and the system as a whole operates with a low energy requirement.

Also, since in the preferred embodiment the rotating impeller pumps have no seals and operate with low friction losses they provide advantages previously obtained only by vapor compression units, while at the same time they avoid many of the disadvantages of prior vapor compression systems.

The entrainment device 11 could, of course, be embodied in many forms other than as shown with a rotating impeller pump, for instance as a submerged pump followed by a return arrangement.

It should be appreciated that the invention may be used for distillation of liquids other than water, in addition that any suitable refrigerant or heat transfer medium may be selected for use in the heat recycling circuit, and that the invention may be embodied in many other configurations.

We claim:

1. A distillation apparatus in which a liquid is evaporated at sub-atmospheric pressures, comprising:
   a sealed evaporation chamber having a feed liquid inlet port, a concentrated liquid outlet port, and a vapor outlet port; a distillate chamber means for containing a distillate, a vapor treating means for receiving vapor from the evaporation chamber and condensing the vapor to release its latent heat of condensation directly to the distillate, said vapor treating means being located in said distillate chamber,
   a blow-down tank, a blow-down entrainment device situated within the blow-down tank, said concentrated liquid outlet port being in communication with said blow-down entrainment device.

2. A distillation apparatus as claimed in claim 1, wherein the vapor treating means includes a rotating impeller pump means for generating a stream of distillate in which the vapor is entrained and condensed such that the latent heat of condensation of the vapor is recovered directly by the distillate, said impeller pump means being wholly immersed in distillate.

3. A distillation apparatus as claimed in claim 2 including means for transferring heat from the distillate to liquid in the evaporation chamber.

4. A distillation apparatus as claimed in claim 2 or claim 3 wherein the impeller pump means has an inlet, a shear tube means positioned in the inlet of the impeller pump means to prevent pre-swirl of the distillate and of gas and vapor entrained in the distillate.

5. A distillation apparatus as claimed in any one of claims 1-3 further including a heating coil in the evaporation chamber, a first heat exchange coil in the distillate chamber, and a heat-pump circuit in which the heating coil is arranged in series with and upstream of the first heat exchange coil.

6. A distillation apparatus as claimed in claim 5 wherein a second heat exchange coil is situated in the blow-down tank and is connected in series in the heat-pump circuit between the heating coil and the first heat exchange coil.

7. A distillation apparatus as claimed in claim 1 wherein the blow-down entrainment device comprises a second pump provided with a rotating impeller which is wholly immersed in said blow-down tank.

* * * * *